(12) United States Patent
Patil et al.

(10) Patent No.: US 11,416,771 B2
(45) Date of Patent: Aug. 16, 2022

(54) SELF-LEARNING PEER GROUP ANALYSIS FOR OPTIMIZING IDENTITY AND ACCESS MANAGEMENT ENVIRONMENTS

(71) Applicant: International Business Machines Corporation, Armonk, NY (US)

(72) Inventors: Priti P. Patil, Wakad (IN); Kushaal Veijay, Wakad (IN); Ian M. Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 16/679,654

(22) Filed: Nov. 11, 2019

(65) Prior Publication Data
US 2021/0142209 A1    May 13, 2021

(51) Int. Cl.
  *G06N 20/00* (2019.01)
  *G06N 5/04* (2006.01)
  *H04L 9/40* (2022.01)

(52) U.S. Cl.
  CPC ............ *G06N 20/00* (2019.01); *G06N 5/04* (2013.01); *H04L 63/102* (2013.01)

(58) Field of Classification Search
  CPC ........ G06N 20/00; G06N 5/04; H04L 63/102; H04L 63/20
  See application file for complete search history.

(56) References Cited

U.S. PATENT DOCUMENTS

| | | | |
|---|---|---|---|
| 8,843,994 B2* | 9/2014 | Tandon | G06F 21/00 |
| | | | 713/153 |
| 9,264,451 B2* | 2/2016 | Chari | H04L 63/20 |
| 9,471,797 B1* | 10/2016 | Biller | G06F 21/604 |
| 10,171,471 B2* | 1/2019 | Biller | G06N 7/005 |
| 10,341,430 B1 | 7/2019 | Badaway et al. | |
| 10,454,939 B1* | 10/2019 | Amram | H04L 63/104 |
| 10,482,268 B1* | 11/2019 | Osborne | G06F 21/6218 |

(Continued)

OTHER PUBLICATIONS

Chen et al., "Deployment Guide for InfoSphere Guardium", Redbooks IBM, 3/14 (Year: 2014).*

(Continued)

*Primary Examiner* — Piotr Poltorak
(74) *Attorney, Agent, or Firm* — Stephen J. Walder, Jr.; Jeffrey S. LaBaw

(57) ABSTRACT

Mechanisms are provided for identifying risky user entitlements in an identity and access management (IAM) computing system. A self-learning peer group analysis (SLPGA) engine receives an IAM data set which specifies user attributes of users of computing resources and entitlements allocated to the users for accessing the computing resources. The SLPGA engine generates a user-entitlement matrix, performs a machine learning matrix decomposition operation on the user-entitlement matrix to identify excessive entitlement allocations, and performs a conditional entropy analysis of the user attributes and entitlements in the IAM data set to identify a set of user attributes for defining peer groups. The SLPGA engine performs a commonality analysis of user attributes and entitlements for each of one or more peer groups defined based on the set of user attributes, and identifies outlier entitlements based on the identification of the excessive entitlement allocations and results of the commonality analysis.

18 Claims, 5 Drawing Sheets

(56) References Cited

U.S. PATENT DOCUMENTS

| | | | |
|---|---|---|---|
| 10,554,665 B1* | 2/2020 | Badawy | H04L 63/0892 |
| 10,679,141 B2* | 6/2020 | Matthiesen | H04L 63/102 |
| 10,681,056 B1* | 6/2020 | Badawy | G06F 21/552 |
| 11,240,278 B1* | 2/2022 | Wang | H04L 51/046 |
| 2005/0138419 A1* | 6/2005 | Gupta | G06F 21/6218 |
| | | | 707/999.009 |
| 2010/0211989 A1* | 8/2010 | Julisch | G06F 21/604 |
| | | | 726/1 |
| 2012/0246098 A1* | 9/2012 | Chari | G06N 20/00 |
| | | | 706/12 |
| 2014/0129268 A1* | 5/2014 | B'Far | G06Q 10/063112 |
| | | | 705/7.11 |
| 2014/0196103 A1* | 7/2014 | Chari | H04L 63/20 |
| | | | 726/1 |
| 2014/0298423 A1 | 10/2014 | Moloian et al. | |
| 2014/0359695 A1* | 12/2014 | Chari | G06F 21/604 |
| | | | 726/1 |
| 2015/0242486 A1* | 8/2015 | Chari | H04L 67/306 |
| | | | 707/737 |
| 2018/0375886 A1* | 12/2018 | Kirti | H04L 67/10 |
| 2020/0274880 A1* | 8/2020 | Badawy | G06F 21/62 |
| 2020/0412726 A1* | 12/2020 | Nevatia | G06F 21/604 |

OTHER PUBLICATIONS

Grafton, Jane, "Identify Outlier Access with "Clustering and K-Means"", Gurucul Online website, Oct. 4, 2018, 5 pages.

Popescu, Ion-Petru et al., "Identity and Access Management—A Risk-Based Approach", Proceedings of the 9th International Management Conference, "Management and Innovation for Competitive Advantage", Nov. 5-6, 2015, pp. 571-580 (9 pages).

Dhamdhere, Mayuri et al., "Peer Group Analysis in Identity and Access Management to Identify Anomalies", International Journal of Engineering and Technology (IJET), vol. 9, No. 3S, Jul. 2017, pp. 116-121 (6 pages).

Kunz, Michael et al., "Attribute quality management for dynamic identity and access management", Journal of Information Security and Applications 44 (2019), pp. 64-79, 16 pages.

Martin, James A. et al., "What is IAM? Identity and access management explained", CSO Online website, Oct. 9, 2018, 12 pages.

* cited by examiner

SELF-LEARNING PEER GROUP ANALYSIS FOR OPTIMIZING IDENTITY AND ACCESS MANAGEMENT ENVIRONMENTS

BACKGROUND

The present application relates generally to an improved data processing apparatus and method and more specifically to mechanisms for performing self-learning peer group analysis for optimizing identity and access management (IAM) computing environments.

Identity and access management (IAM) is an information technology mechanism for controlling access to computing resources by defining and managing roles and privileges of individual users and the circumstances under which the users are granted or denied those privileges. The objective of IAM computing systems is to ensure that users are given the correct set of privileges (for accessing enterprise assets) for their particular role within the enterprise, under the proper circumstances, and to maintain that set of privileges, which may include modifying those privileges based on changes in circumstances, over the "access lifecycle" of the user, e.g., during the user's employment or other association with the organization. See Martin et al., "What is IAM? Identity and Access Management Explained," CSO Online website, Oct. 9, 2018.

IAM computer systems provide computer system and network administrators with computer tools for performing various operations for managing the identities and the privileges (also referred to as permissions or access entitlements) with regard to the computing system resources (hardware, software, and/or data structures) that they manage. For example, such computer tools allow for administrators to change a user's role, track user activities, create reports on those activities, and enforce access and security policies. Examples of IAM computer tools include IBM Security Secret Server™ and IBM Security Privilege Manager™, available from International Business Machines (IBM) Corporation of Armonk, N.Y. Information about these products may be found at the IBM Identity and Access Management Solutions website.

SUMMARY

In one illustrative embodiment, a method, in a data processing system, is provided for identifying risky user entitlements in an identity and access management (IAM) computing system. The method comprises receiving, by a self-learning peer group analysis (SLPGA) engine executing in the data processing system, an IAM data set from the IAM computing system. The IAM data set specifies user attributes of one or more users of computing resources and entitlements allocated to one or more users for accessing the computing resources. The method further comprises the SLPGA engine generating a user-entitlement matrix based on the IAM data set and executing a machine learning matrix decomposition computer model on the user-entitlement matrix to identify excessive entitlement allocations. The method also comprises the SLPGA engine performing a conditional entropy analysis of the user attributes and entitlements in the IAM data set to identify a set of user attributes for defining at least one peer group. Moreover, the method comprises the SLPGA engine performing a commonality analysis of user attributes and entitlements for each of one or more peer groups defined based on the set of user attributes to identify common and uncommon combinations of user attributes and entitlements in each peer group of the one or more peer groups. In addition, the method comprises the SLPGA engine identifying outlier entitlements based on the identification of the excessive entitlement allocations and results of the commonality analysis.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
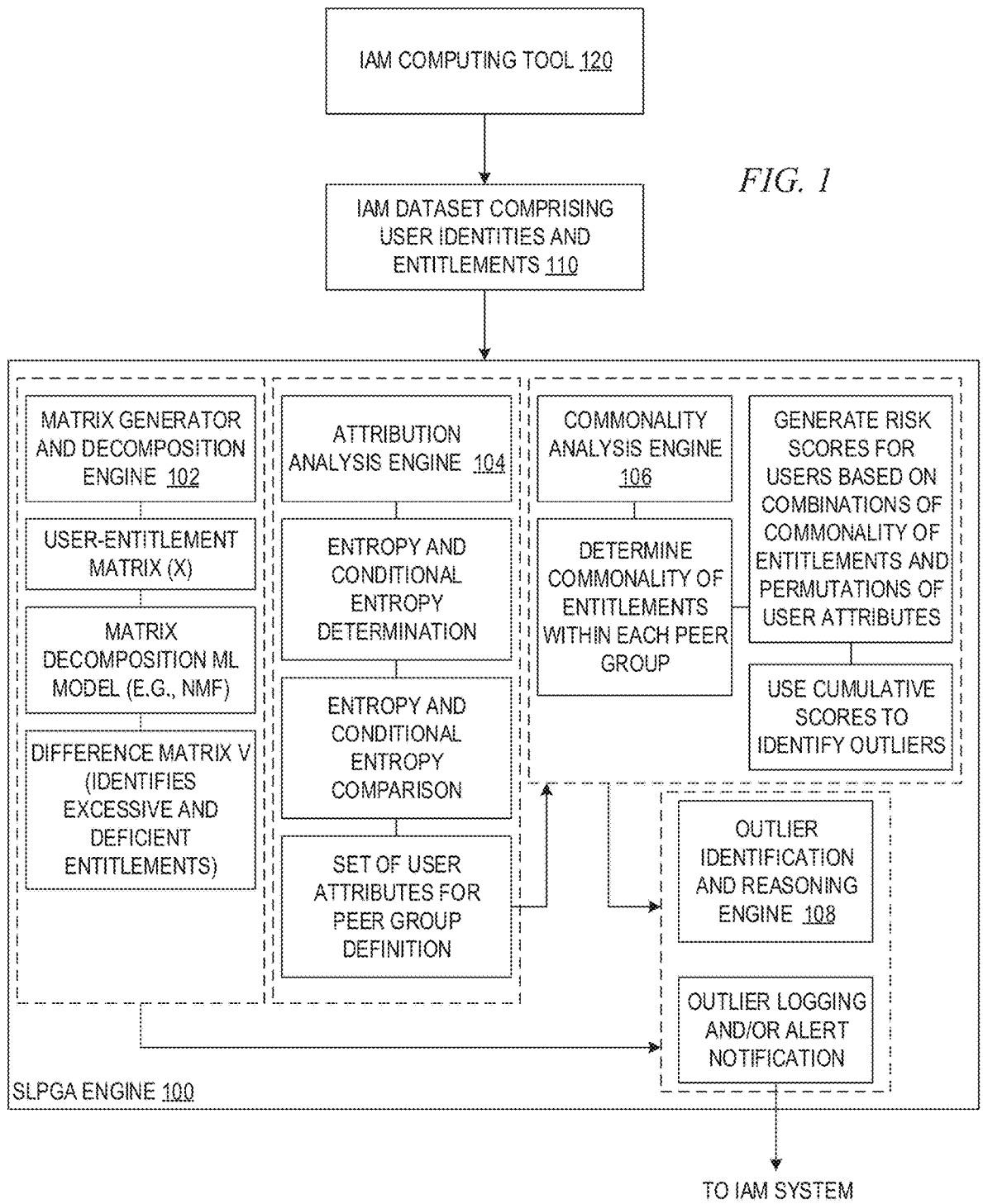
FIG. 1 an example block diagram illustrating a process for performing self-learning peer group analysis for optimizing identity and access management (IAM) computing environments in accordance with one illustrative embodiment.

As mentioned above, identity and access management (IAM) tools provide a mechanism by which administrators of computing systems and networks may ensure proper controls over access to computing resources, which includes the hardware, software, and data structures of an enterprise or organization. One mechanism used to investigate privileges granted to users is peer group analysis. Peer group analysis (PGA) is a technique which compares data of "peers" to identify various insights, where these insights depend on the domain to which PGA is applied. In the case of IAM, PGA is used to evaluate a user's privileges compared to other users within a predetermined peer group, such as the enterprise as a whole, a department within the enterprise, a job, a role, etc., or a peer group that is defined in terms of similar behaviors of users.

By evaluating users compared to their peers using a PGA technique, the analytics engine employing PGA may identify outlier access privileges and can be used to determine which accesses a user should have when the user joins the enterprise or organization or circumstances change with regard to an existing user, e.g., the user changes jobs, roles, departments, etc., within the enterprise or organization. The results of PGA may also be of particular interest to administrators when performing access review or access certification since it will inform their decisions regarding whether to change privileges assigned to particular users. An example of a PGA technique used with IAM for identifying anomalies in access entitlements is described in Dhamdhere et al., "Peer Group Analysis in Identity and Access Management to Identify Anomalies," International Journal of Engineering and Technology (IJET), volume 9, no. 35, July 2017.

As can be seen from the overview of PGA above, PGA techniques required that the human administrator employing the PGA technique specify the definition of the user attributes which are used to define the peer group that is the basis of the PGA operation, e.g., which roles, job titles, departments, etc., define the peer group for PGA. While this may be sufficient for small scale enterprises, for medium and large enterprises or organizations, due to the complex organizational structures, it may not be a simple task to identify which attributes define peer groups, and the attributes that define a particular peer group may change over time. That is, manual processes are error prone and the resulting peer groups generated from manual processes may not in fact really predict entitlements, which results in negative outlier accesses.

The illustrative embodiments provide mechanisms for performing a self-learning approach to automatically identify peer groups for PGA and provide an identification of outlier privileges or access entitlements (referred to hereafter as "entitlements") with reasoning for this identification. The self-learning mechanisms of the illustrative embodiments perform an attribution analysis to learn peer group attributes based on users and their entitlements and determines which attributes reliably predict entitlements and thus, can be used in PGA. The self-learning approach provides tuning parameters such that it may be used with various machine learning algorithms to generate more accurate insights from the PGA performed.

With regard to outlier entitlement identification, PGA determines outliers based on an organization's user-to-entitlement mapping. However, access control configurations in medium to large organizations tend to be noisy for various reasons. For example, these access control configurations may contain undesirable over- and under-assignments. Moreover, these access control configurations may assign privileges based on other factors other than the particular roles of the user, i.e. there may be privilege assignments that are considered "exceptions" to the security policies defined for the particular roles. Thus, it is necessary for role mining to deal with noisy data. Because of this, the mechanisms of the illustrative embodiments utilize a machine learning technique, such as various matrix decomposition models, e.g., a non-negative matrix factorization (NMF), to identify noise in access control data. NMF, for example, provides good performance with regard to identifying errors in user-entitlement relations and excellent predictive performance for missing values with low false positive and negative rates.

Matrix decomposition model, such as NMF, utilizes specific tuning parameters. The mechanism of the illustrative embodiments provide a self-learning approach to determine the appropriate values for these tuning parameters based on data and reconstruction errors. As such, the mechanisms of the illustrative embodiments may be used with various data sets since the tuning parameters may be automatically set for the data set using the mechanisms of the illustrative embodiments.

The mechanisms of the illustrative embodiments further provide statistical analysis tools for analyzing entitlement commonality for attributes identified via the attribution analysis so as to be able to identify outlier entitlements. The statistical analysis provides reasoning as to why the identified entitlements may be considered outliers which can then inform the human administrator and provide additional insights for decision support.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 an example block diagram illustrating a process for performing self-learning peer group analysis for optimizing identity and access management (IAM) computing environments in accordance with one illustrative embodiment. This process is implemented in an improved computing tool, referred to as the self-learning peer group analysis (SLPGA) engine, which provides specific computer logic to perform the various operations depicted in FIG. 1 and described in more detail hereafter. The SLPGA engine 100 may be provided on one or more server computing devices, as a cloud service provided in a cloud computing environment, or the like, as will be discussed hereafter. It should be appreciated that this process is specifically performed by a specially configured computing device, or set of computing devices, and is performed specifically to address the drawbacks of computer performed peer group analysis for identity and access management systems as discussed above. Thus, the mechanisms of the illustrative embodiments define a specific computing system providing a specific technological solution to a technological problem and provide a practical application of that technological solution specifically to identity and access management with regard to controlling access by users to computing resources.

It should be appreciated that, in some illustrative embodiments, the SLPGA engine 100 of the illustrative embodiments may be provided as a cloud service, as noted above, such that it may interface with enterprise or organization (hereafter referred to simply as an enterprise) implemented identity and access management (IAM) computing tools 120 to obtain IAM data sets 110 and then provide back to the IAM computing tool 120 information regarding any outlier entitlements identified by the SLPGA engine 100. In other illustrative embodiments, the SLPGA engine 100 may be integrated into the IAM computing tool 120 which may be provided to an enterprise as a complete cloud service (combining the IAM and SLPGA mechanisms and their corresponding operations) or deployed as a complete tool within the enterprise's computing system as a licensed tool executed by the enterprise's own administrators.

The operation performed by the SLPGA engine 100 involves four main operations as follows:

1. Perform approximate matrix decomposition to identify undesirable user entitlements;
2. Find attributes to be used for peer group analysis using attribution analysis;
3. Perform commonality analysis to identify outliers which have a commonality metric below a threshold; and
4. Combine the results of operations 1 and 3 above to output outlier entitlements with reasoning based on the commonality analysis.

Each of these operations will be described in greater detail hereafter with reference to FIG. 1.

As shown in FIG. 1, in order for the SLPGA engine 100 to perform its operations, the SLPGA engine 100 receives, as input, the enterprise or organization's IAM data set 110, which includes user information and entitlement information data structures, as well as mappings of users to entitlements from their identity and access management (IAM) computing tool 120. These data structures are typically maintained by an IAM computing tool 120 and thus, a detailed explanation of these data structures is not provided herein. However, it should be appreciated that these data structures identify the users and map those users to particular entitlements that the user has been given through the IAM computing tool 120 for accessing computing resources (hardware, software, and/or data structures) in the enterprise computing system and/or enterprise networks. In addition to the IAM data set 110, an enterprise system administrator may provide, such as via the IAM computing tool 120 an initial input of a commonality threshold parameter value indicating a degree of commonality that the system administrator wishes to use as a basis for identify outlier entitlements. This commonality threshold value defines how common an entitlement must be within a peer group for it to be considered common amongst the peer group. Entitlements that do not meet or exceed this commonality threshold value may be considered outlier entitlements which may need further investigation and reconsideration as part of an entitlement certification process, for example.

Based on the IAM data set 110, as part of the first main operation of the SLPGA engine 100 enumerated above, a matrix generation and decomposition engine 102 of the SLPGA engine 100 generates a matrix X of user-to-entitlement mappings, e.g., X=n×m where n is the number of users and m is the number of entitlements such that if the $n^{th}$ user has the $m^{th}$ entitlement, then the corresponding value in the matrix X at the intersection of the row/column is a first value, e.g., 1, and if the $n^{th}$ user does not have the $m^{th}$ entitlement, then the corresponding value in the matrix X is a second value, e.g., 0. For example, a row in the matrix X represents the entitlements m that a user n has, and may be referred to as an entitlement vector for the user. The SLPGA engine 100 applies a machine learning matrix decomposition model to the matrix X, where the machine learning matrix decomposition computer model (or simply matrix decomposition model) is a machine learning computer model where error in the operation of the matrix decomposition model is evaluated and hyperparameters of the matrix decomposition model are iteratively tuned to reduce this error to a predetermined threshold level of acceptable error, i.e. minimize the error measure. For example, the SLPGA engine 100 may apply a non-negative matrix factorization (NMF) matrix decomposition model on the data of the matrix X to produce two matrices, W and H, such that X≈W×H and W and H have dimensions n×r and r×m, respectively. Thus, the combination of W and H approximates the original matrix X. By applying the non-negative matrix factorization (NMF), also referred to as non-negative matrix approximation, each of the matrices X, W, and H have the property that they have no negative elements. This non-negativity makes the resulting matrices easier to inspect.

The difference matrix V 130 between the original matrix X generated from the IAM data set 110, and the approximation of X generated by application of the matrix decomposition model, is generated by the SLPGA engine 100. Negative values in the difference matrix V 130 are indicative of missing entitlements, i.e. entitlements that users should have but which are not in the original matrix X. That is, if a value is negative that means that the approximation generated by the matrix decomposition model indicates an entitlement for a user, but the original matrix X does not include that entitlement. Positive values in the difference matrix V 130 indicate entitlements that appear in the original matrix X but are not in the generated approximation, which may be indicative of an over privileging of the user's entitlements, i.e. unnecessary entitlements which the user should not have, and thus, the user may be able to perform malicious actions with regard to computing resources.

The NMF approximation has a given rank, k, which is the number of components that are being used to represent the original matrix. X=W*H where W has k rows and H has k columns. With a sufficiently large k, these will converge on being equal. When k is reduced, the NMF algorithm will attempt to find the best match given k. The "signal", or the assignments that are likely to be correct and easy to express, are thus the first learned, while the noise is more difficult and nuanced, and likely results from errors or exceptions to the entitlement allocation policies. The difference matrix V is thus, meaningful to investigate.

The matrix decomposition model may be automatically tuned as part of a machine learning operation to ensure that it is properly applied to various data sets from various IAM computing systems. That is, different IAM data sets 110 from different enterprises may differ with regard to the users and entitlements that the enterprise uses. A tunable hyper-parameter k value is used that depends on the data, i.e. the IAM data set 110, under consideration. The hyper-parameter k value may be determined by performing an automated optimization evaluation using various values of k, learning the model by computing the NMF, and then evaluating the resulting model. In one illustrative embodiment, this automated tuning of the machine learning model operates to find a best value of k so that a reconstruction error for reconstructing a user's given privileges is minimized. That is, when performing the matrix factorization as part of applying the matrix decomposition model, a goal is to find a new low-rank k basis for representing the data set 110. This will generally be some value between 1 and min (distinct(n), distinct(m)).

The value of k determines how many different "parts" can be used to reconstruct the entitlement vector for a given user. That is, one way of viewing NMF is as a decomposition of something, e.g., user-to-permission assignments in the present illustrative embodiments, into a sum of parts. For example, this sum of parts in the illustrative embodiments may be expressed as X=W*H where the W matrix is the user-by-parts relationship which gives how strongly a user has a set of features, and H is the assignment of permissions to each of those parts. The parts may also be referred to as a "basis."

In one illustrative embodiment an elbow technique is used to find the best value for k. The elbow technique is a heuristic method of interpretation and validation of consistence within cluster analysis designed to help find the appropriate number of clusters in a dataset. With the elbow method, if one plots the percentage of variance explained by the clusters against the number of clusters, the first clusters will add more information, i.e. explain a lot of variance, but at some point the marginal gain will drop, giving an angle in the graph. The number of clusters is chosen at this point, i.e. at the elbow of the graph.

This technique is applied to a plot, or functional or numerical representation of a plot, of the k values against reconstruction error, e.g., the difference between the original matrix X and the approximation (W*H), i.e. X−W*H, in the mechanisms of the illustrative embodiments. In some illustrative embodiments, a norm may be applied to the reconstruction error X−W*H, such as an L2 norm, to obtain a single error value $\|X-W*H\|\_2$. That is, the values of k versus the reconstruction error are plotted and the elbow point in this graph is selected as the k value for the matrix decomposition model that is applied to the original matrix X as described previously.

For example, in one illustrative embodiment, if the number of users in the original user-entitlement matrix X is n, then starting with kRoot, where kRoot=sqrt(n), a minimum of 15 k values (10 below and 5 above kRoot) at a distance of 0.1*kRoot are utilized. The variable kRoot is a variable defined for the k optimization algorithm as an initial starting point for identifying an optimum k value. Based on empirical evaluations, it has been determined that the optimum value of k likes in the proximity of kRoot. Thus, in this illustrative embodiment, a range of 10 values below and 5 values above kRoot at a distance of 0.1*kRoot is utilized. For example, if the number of users n is 10,000, then to identify the optimum value for k, kRoot is initialized as sqrt(10,000), i.e. 100. Then the k optimization algorithm iterates from k=10 (10 values below 100 at a distance of 0.1*100) to k=150 (5 values of k above 100 at a distance of 0.1*100). For each k value selected, e.g., k=10, 20, 30, . . . 100, 110, . . . 150, the corresponding reconstruction error for all users is calculated.

Thus, as a result of this first main operation of the SLPGA engine 100, a difference matrix V=X−(W×H) is generated, after tuning the matrix decomposition model and applying it to the original matrix X to generate the decomposed matrices W×H approximating the original matrix X. Values in the difference matrix V may be positive, zero, or negative. Positive values in the difference matrix V indicate potential risk of unnecessary entitlements being assigned to corresponding users, i.e. entitlements that the user has in the original matrix X but may not need. Negative values in the difference matrix V indicate potential missing entitlements for a user, i.e. entitlements that the user should be given but are not present in the original matrix X. The positive values are indicative of outliers which may need to be further evaluated by enterprise computing system administrators as these users have entitlements or permissions that they may not need, i.e. these users are over privileged, and may represent potential attackers that can perform malicious operations on computing resources.

In a second main operation of the SLPGA engine 100, an attribution analysis engine 104 of the SLPGA engine 100 performs an attribution analysis of security policies, based on the concept of conditional entropy, in order to find the attributes that can be used to define a peer group for performing peer group analysis. As noted previously, peer group analysis relies on a human administrator specifying the definition of user attributes which can be used as a basis for defining the peer group, i.e. which user's entitlements are compared to identify outliers. In medium/large organization, due to complex organizational structure it may not be simple to identify such attributes which define peer groups and these attributes may change over time. The attribution analysis engine 104 of the SLPGA engine 100 of the illustrative embodiments uses an attribution analysis to learn peer group attributes based on users and their entitlements as indicated in the IAM data set 110. This attribution analysis identifies the attributes which reliably predict the correct entitlements for those users and, thus, can be used in peer group analysis.

Thus, in one illustrative embodiment, the attribution analysis engine 104 of the SLPGA engine 100 performs attribution analysis of security policies based on using conditional entropy. To understand this concept further, consider the assignment of users to an entitlement, or privilege, P (while this example will consider a privilege P, similar considerations apply to any other user attribute, such as role, group or department, task, etc.). The user's set of entitlements may be represented as a 0-1 valued vector whose $i^{th}$ entry is 1 if the user is assigned that entitlement (privilege) and 0 otherwise. The entropy of the entitlement assignment for the user is H(P). Entropy is the amount of information that is required to express something. Imagine a permission is assigned to every user, i.e. users 1 to n in the original matrix X. In this situation, there is very little information that is required to codify the column in the original matrix X for that permission as it is known that the column is composed of all 1s. Alternatively, if half of the users are assigned the permission, this is the maximum point for the entropy, i.e. it takes the most information (and the most difficulty) to express the relationship between the user attributes and the assignment, or lack of assignment, of the privilege to the user.

Conditional entropy is how much entropy there is if something else is known, e.g., another permission assignment or a user attribute, such as the user's department. With these concepts in mind, given a single user attribute A, the SLPGA engine 100 can estimate how the attribute influences the assignment of an entitlement, or privilege, P to users. To do this the SLPGA engine 100 computes the conditional entropy H(P|A) over the space of all users. In some illustrative embodiments, the entropy is determined using the definition for Shannon entropy:

$$S = -\sum_i P_i \log P_i$$

To compute $P_i$, the fraction or percentage of the users that have the assignment is calculated. Thus, if 7 users have permission I, and there are 12 users, then $P_i$=7/12. The conditional entropy is calculated using the following formulation:

$$H(Y \mid X) = -\sum_{x \in X, y \in Y} p(x, y) \log \frac{p(x, y)}{p(x)}$$

Where p(x,y) is the probability of both x and y (the number of users that have a given permission and an attribute) and the summation is over all permissions and attributes.

Once the entropy H(P) and conditional entropy (H(P|A)) are computed for each combination of entitlement, or privilege, P and user attribute A, over the space of all users, the SLPGA engine 100 can compare the conditional entropy to the entropy for each combination of entitlement and user attribute. If the conditional entropy H(P|A) is low relative to H(P), e.g., equal to or below a threshold value of the entropy H(P), then knowing the value of the user attribute A reduces the uncertainty about the assignment of the entitlement P and thus, the user attribute A is a good predictor of the entitlement P being properly assigned to the user. If the conditional entropy H(P|A) is the same, or close to, the entropy H(P), such as H(P|A) being within a threshold amount of the entropy H(P), then knowing the user attribute A is not informative about the assignment of the entitlement P and has little influence on the assignment of the entitlement P.

Thus, by computing and comparing the entropy and conditional entropy of each pairing of an entitlement with a user attribute, a set of user attributes that are considered to be influential in the assignment of the entitlement to a user may be identified, e.g., the user attributes determined to be good predictors based on the comparison of entropy and conditional entropy. This set of attributes are then used as a basis for defining a peer group for performance of a peer group analysis.

This process for identifying the user attributes that are influential in the assignment of entitlements may be completely automated. For example, in one illustrative embodiment, all user attributes are considered without discrimination and the entropy of each of these user attributes is calculated. The entropy may be estimated based on function of a probability $Prob_i$ that a user has a given entitlement, or permission, $P_i$ where i indicates the $i^{th}$ entitlement in the set of entitlements m. In one illustrative embodiment, the entropy is the percentage of users that have the particular entitlement $P_i$. A "control" user attribute $A_{control}$ is selected as a basis for comparison of the entropies associated with other user attributes. The "control" user attribute $A_{control}$ is one that is unique to each user, e.g., employee number, and thus should have a maximum entropy, i.e. employee number should have no bearing on which entitlements are given to a user. Other user attributes A whose entropies are determined to be relatively "low" are dropped from further consideration for inclusion in the set of attributes for defining a peer group, e.g., those user attributes whose entropies are less than 10% of the entropy of the control user attribute $A_{control}$ may be dropped. This is only one example, and other thresholds may be defined for identifying which user attributes to drop from consideration, without departing from the spirit and scope of the present invention. Dropping these user attributes eliminates attributes which have the same or very few values for most of the users and hence are unlikely to influence the assignment of variables.

Similarly, the "high" entropy user attributes may also be dropped from further consideration. For example, user attributes A whose entropy is at least 90% of the entropy of the control user attribute $A_{control}$, e.g., employee number attribute, may be dropped from further consideration for inclusion in the set of attributes for defining a peer group. These attributes are synonyms for the employee number and will not be predictive of entitlement assignments.

From the remaining set of attributes A, the SLPGA engine 100 identifies groups of user attributes which are synonyms to each other. For example, department name and department number are very likely synonyms. There may be a few cases of departments with the exact same name but with different numbers, but in most other cases these attributes will be unique. It is desirable to consider only a single member from each group of identical or synonymous user attributes. To identify identical or synonymous user attributes, the SLPGA engine 100 may, for each pair of user attributes A and B, estimate the conditional entropy H(A|B) compared to H(A), i.e. how well user attribute B reduces the uncertainty about user attribute A. Similarly, the SLPGA engine 100 compares the conditional entropy H(B|A) to the entropy H(B). If user attribute A predicts user attribute B very well, i.e. as measured against a predetermined threshold, and vice versa they are considered equivalent or synonymous. As a result, one of the user attributes A or B is dropped from further inclusion in the set of attributes for peer group identification, as either is equally representative for predicting entitlement assignments. For example, the user attribute A or B that has the higher relative entropy may be dropped.

The user attributes that remain, after this dropping of the "low" and "high" entropy user attributes, and the selection of user attributes after identifying identical or synonymous attributes, are considered relevant for attribution analysis. For each of these relevant user attributes, the SLPGA engine 100 estimates the average reduction in entropy of entitlement assignments over the entire set of entitlement assignments. This gives an estimate of how well the user attribute is able to predict entitlement assignments on average. If the average entropy reduction is small, the user attribute is eliminated from further consideration as part of the set of user attributes that are defining of the peer group.

The set of remaining attributes are the ones which are relevant for predicting entitlement assignments. From here the SLPGA engine 100 evaluates all combinations of these user attributes in the set of remaining attributes, and determines how well these combinations are at predicting a specific entitlement assignment. This also, in many cases, yields the precise formula or combination of user attributes and user attribute values which indicates an entitlement assignment. Thus, as a result of the operations performed as part of the second main operation of the SLPGA engine 100, a set of user attributes that are predictive of entitlement assignments is generated and can be used as part of a PGA operation to define the peer group being evaluated.

With regard to the third main operation of the SLPGA engine 100, a commonality analysis engine 106 of the SLPGA engine 100 performs a commonality analysis is performed to identify outlier entitlements. With regard to this third main operation, in order to identify an entitlement's commonness in a peer group, such as the peer group defined by the user attributes identified in the second main operation described above, all of the users specified in the IAM data set 110 are classified based on the set of attributes identified in the second main operation, e.g., location, role, job, department, etc. For each entitlement, a percentage of users, in the defined peer group, who have been assigned that entitlement is determined. This gives an indication of how common or uncommon a particular entitlement is within the peer group. For example, out of a total of 1000 users at a location L1, if 950 users have access to an entitlement, or permission, P1, i.e. 95% of the users at L1 have access to P1, it can be determined that the entitlement P1 is a very common entitlement for people in the peer group defined by the user attribute L1, i.e. users at location L have a 95% probability of being assigned entitlement P1.

To quantize this commonality of an entitlement, also referred to as a certainty of the entitlement, in one illustrative embodiment, a function is provided that grows linearly for common entitlements and then grows exponentially for uncommon entitlements. For example, the following function may be utilized to quantize the certainty of an entitlement: $F(x)=MAX(a1x+b1x+c1, a2x+b2)$, where $a1=0.0099$, $b1=-1.98$, $c1=100$, $a2=-0.495$, and $b2=50.5$, which gives $F(x)=MAX((0.0099*x)+(-1.98*x)+100, (-0.495*x)+50.5))$. In this example function, each entitlement may have a commonality score, or commonality percentage, X whose value is between 1 and 100, where a score of 100 is associated with the most uncommon entitlements and a score of 1 is associated with the least uncommon, or most common, entitlements, e.g., in the previous example above, the commonality score or percentage is 0.95 or 95% indicating that 95% of users in the peer group corresponding to location L1 are granted entitlement P1. The values of the coefficients a1, b1, c1, a2, and b2 are created, in accordance with one illustrative embodiment, considering the fact that the function is to grow linearly for higher commonality till a commonality threshold is reached, e.g., 50% commonality in this example, and then grows quadratically for lower commonality. The coefficients can differ if a different commonality threshold other than 50 is selected for the particular embodiment. Moreover, in some illustrative embodiments, a different function may be utilized that provides a similar characteristic of linear growth until a commonality threshold is reached, with exponential growth thereafter.

For example, if 69% of people at location L1 have access to permission P1, i.e. X=69, the commonality score f(x) associated with P1 under L1 would be MAX(10.5, 16.3). To get the correct commonality score for the entitlement, the maximum value of (10.5, 16.3) is selected, which is 16.3 in this example. On the other hand, if only 19% of the users at location L2 have access to permission P2, the commonality score associated with P2 under L2 would be MAX(66, 41) which is 66 in this case. This mix of linear+exponential gradient gives a graph which is stable at the start and then has a steep rise in score with decrease in commonalty percentage of users having access to an entitlement, or permission.

To find the risk score of a particular user based on a user attribute, the SLPGA engine 100 takes the summation or aggregation of commonality scores of entitlements that have been calculated earlier for individual user attributes of that user. For example, consider that user U1 has access to entitlements (or permissions) P1, P2 and P3 and his location is L1. The scores previously calculated for P1, P2 and P3 under location attribute L1 happen to be 8, 32 and 64, respectively, in this example. Thus, the risk score of user U1 based on the L1 location user attribute would be summation of the commonality scores for each of the entitlements P1, P2, P3 with regard to location L1, i.e. the summation of 8, 32 and 64, which happens to be 104. This is one example method for generating a risk score for a user. Other methods of aggregating the scores for entitlements and user attributes may be utilized in one or more other illustrative embodiments without departing from the spirit and scope of the present invention.

Once the risk score of each user based on individual peer groups is obtained, such as based on an aggregation method as described above, for example, these scores are combined to evaluate the risk score for different permutations of peer groups and finally a combination of all of them. As an example, consider again a user U1 has access to entitlements (permissions) P1, P2 and P3 and his location (peer group) is L1. The commonality scores previously calculated for P1, P2 and P3 under location attribute L1 (peer group 1) happen to be 8, 32 and 64 respectively. Thus, the cumulative risk score is 104, as noted above. Consider also that the user U1 has access to entitlements (permissions) P1, P2 and P3, and his manager (peer group 2) is M1, such that the commonality scores calculated for P1, P2 and P3 under manager user attribute M1 happen to be 25, 50 and 70 respectively. Thus, the cumulative risk score is 145 for the entitlements (permissions) under the manager user attribute M1. In addition, assume that user U1 has access to permissions P1, P2 and P3 and his job title (peer group 3) is J1. The commonality scores calculated for P1, P2 and P3 under job title user attribute J1 happen to be 15, 27 and 42 respectively, giving a cumulative risk score of 84.

As a result, with these scores in mind for each of the user attributes for user U1, the risk score of user U1 based on L1, M1 and J1 attribute would be (104+145+84)/3=111. The risk score of user U1 based on L1 and M1 attribute would be (104+145)/2=124.5. The risk score of user U1 based on M1 and J1 attribute would be (145+84)/3=114.5. The risk score of user U1 based on L1 and J1 attribute would be (104+84)/3=94.

In other illustrative embodiments, other methodologies may be used to calculate the risk scores of the combined user attribute peer groups. One approach may be to take the mean of each of these risk scores and obtain the combined risk score. For example, if User U1 has a risk score of 110 under manager user attribute M1 and 10 under the Job Role user attribute J1, then the combined risk score of the U1 would be (110+10)/2=60. However, using the mean does not take into consideration the relative sizes of the peer groups when calculating the mean, i.e. the number of users in each of the peer group. For example, the combined risk scores calculated based on the risk scores associated with the Job Role peer group, which may have only a few users, compared to the number of users under the Location peer group, which may have a relatively larger number of users, and therefore, the mean based approach may not be completely reliable. Thus, a weighted function of the risk scores of the user attribute peer groups may be utilized to represent the different levels of confidence in the risk scores for the various peer groups. In particular, peer groups that have a relatively larger size or number of users present in the peer group may be given a relatively higher weight than peer groups that have a relatively smaller size or number of users.

In one illustrative embodiment, the weight factors are computed by determining an estimate of the average number of users belonging to each peer group for a user attribute. Thus, to calculate the weight for each peer group for a user attribute, the following formula may be utilized: Weight=e(−q/Q), where, q is the number of persons in the peer group and for Q is a value selected to represent an importance attached to the user attribute(s) associated with the peer group. Hence, a mean of the number of users belonging to peer groups of a particular attribute, say M and take Q=−M/ln(½)≈4.44M, i.e. 1.44*mean (M). Let q represent the actual number of users belonging to an attribute type for the user attribute of the peer group being considered and Q represent the average number of users that belong to a type of the same user attribute. Thus, the weight for this attribute type is given as Weight=e(−q/1.44M).

Once the cumulative risk scores for the users are generated using one or more of the illustrative embodiments described above, these risk scores may be used to identify outliers based on user attribute peer groups. A threshold risk score value is set at (mean+0.5*standard deviation), where the mean is the mean risk score for the peer group or cumulative risk scores for multiple peer groups, and the standard deviation is the standard deviation of the risk scores for the peer group or cumulative risk scores for multiple peer groups. The users whose cumulative risk scores from their peer groups that fall below the threshold risk score value are flagged as "green", meaning that these users are non-risky and have an appropriate allocation of user entitlements or permissions for their user attributes. Users whose cumulative risk scores fall between (mean+0.5*standard deviation) and (mean+1.5*standard deviation) are flagged as "yellow," meaning that these users have a low risk of being over privileged. Users whose cumulative risk scores fall above the (mean+1.5*standard deviation) are flagged as "red," meaning that they have a high risk of being over privileged. It is these "red" flagged users that are determined to be the outliers determined based on commonality of entitlements for user attribute peer groups. In some illustrative embodiments, "yellow" flagged users may also be included as outliers as well, depending on the level of risk that the particular enterprise computing system administrator has configured for the evaluation.

With regard to the fourth main operation of the SLPGA engine 100, an outlier identification and reasoning engine 108 of the SLPGA engine 100 combines the results of the first and third main operations to identify outlier entitlements with reasoning based on the commonality analysis. That is, in the first main operation, the matrix decomposition operation identifies outliers based on positive values in the difference matrix. In the third main operation, the commonality evaluation identifies outliers based on the commonality scores generated for the various peer groups and a threshold score value. The intersection of these two sets of outliers is selected to represent the actual outlier users. For these outlier users, the cumulative score based on multiple peer groups, as generate in the third main operation, is used as the risk score for the user indicating a risk that the user has an entitlement which the user should not have.

Moreover, the values in the difference matrix V in the first main operation provide an indication of the probability of the user's entitlement assignment which can be used as the confidence factor. That is, as mentioned earlier, computing the difference between the input and approximation X−W×H, any positive values represent users having unnecessary entitlements. The higher the positive value, the higher the chance that a user should not have that particular entitlement. The positive values in the difference matrix V are thus, regarded as the probability that a user should not have that entitlement and hence, is a confidence with which the process conveys that the user should not have that entitlement.

To illustrate this further, consider the following example. Assume a matrix V(15,10), with users from U1 to U15, having entitlements from E1 to E10. The value 1 represents that user has an entitlement, whereas the value 0 represents that the user does not have that entitlement.

|  | E1 | E2 | E3 | E4 | E5 | E6 | E7 | E8 | E9 | E10 |
|---|---|---|---|---|---|---|---|---|---|---|
| U1 | [0. | 1. | 0. | 0. | 0. | 0. | 0. | 0. | 0. | 0.] |
| U2 | [0. | 1. | 1. | 0. | 0. | 0. | 0. | 0. | 0. | 0.] |
| U3 | [0. | 0. | 0. | 0. | 0. | 0. | 0. | 1. | 0. | 0.] |
| U4 | [0. | 0. | 0. | 0. | 0. | 0. | 0. | 0. | 0. | 1.] |
| U5 | [0. | 0. | 1. | 0. | 0. | 0. | 1. | 0. | 0. | 0.] |
| U6 | [0. | 0. | 0. | 0. | 0. | 1. | 0. | 0. | 0. | 0.] |
| U7 | [0. | 1. | 0. | 0. | 0. | 1. | 0. | 0. | 0. | 0.] |
| U8 | [0. | 1. | 0. | 1. | 0. | 0. | 0. | 0. | 0. | 0.] |
| U9 | [0. | 0. | 0. | 0. | 0. | 0. | 0. | 0. | 0. | 0.] |
| U10 | [0. | 0. | 0. | 0. | 0. | 0. | 1. | 0. | 0. | 0.] |
| U11 | [0. | 0. | 0. | 0. | 0. | 0. | 0. | 0. | 1. | 0.] |
| U12 | [0. | 0. | 0. | 0. | 0. | 0. | 0. | 0. | 0. | 0.] |
| U13 | [0. | 1. | 0. | 0. | 1. | 0. | 0. | 0. | 1. | 0.] |
| U14 | [1. | 0. | 0. | 0. | 0. | 0. | 0. | 0. | 0. | 0.] |
| U15 | [0. | 0. | 0. | 0. | 0. | 0. | 0. | 0. | 0. | 0.] |

The above User Entitlement matrix can be broken down using NMF into W and H matrices as shown below.

Matrix W(15, 3):

[0.5749233  0.  0.]

[0.6076426  0.33278863  0.]

[0.  0.  0.]

[0.  0.  0.]

[0.  1.02835185  0.]

[ 0. 0. 0. ]
[ 0.53799184 0.6378975 0. ]
[ 0.71799146 0. 0. ]
[ 0. 0. 0. ]
[ 0. 0.66346946 0. ]
[ 0. 0. 0.65025362 ]
[ 0. 0. 0. ]
[ 0.52548146 0. 1.01643505 ]
[ 0. 0. 0. ]
[ 0. 0. 0. ]

Matrix $W$(3, 10):

[ 0. 1.62006006 0.14650809 0.40317481 0.09629312 0. 0. 0. 0. 0. ]
[ 0. 0.04322058 0.63573479 0. 0. 0. 1.15598104 0. 0. 0. ]
[ 0. 0.10380171 0. 0. 0.66279057 0. 0. 0. 1.14472735 0. ]

So, now when the matrix is reconstructed using NMF, the V_approximation Matrix is obtained as follows:

V_approximation(15, 10):
[ 0. 0.93141028 0. 0. 0. 0. 0. 0. 0. 0. ]
[ 0. 0.99880083 0.30058987 0. 0. 0. 0. 0. 0. 0. ]
[ 0. 0. 0. 0. 0. 0. 0. 0. 0. 0. ]
[ 0. 0. 0. 0. 0. 0. 0. 0. 0. 0. ]
[ 0. 0. 0.65375905 0. 0. 0. 1.18875524 0. 0. 0. ]
[ 0. 0. 0. 0. 0. 0. 0. 0. 0. 0. ]
[ 0. 0.89914938 0. 0. 0. 0. 0.73739741 0. 0. 0. ]
[ 0. 1.16318929 0. 0.28947607 0. 0. 0. 0. 0. 0. ]
[ 0. 0. 0. 0. 0. 0. 0. 0. 0. 0. ]
[ 0. 0. 0. 0. 0. 0. 0.76695811 0. 0. 0. ]
[ 0. 0. 0. 0. 0. 0. 0. 0. 0.74436311 0. ]
[ 0. 0. 0. 0. 0. 0. 0. 0. 0. 0. ]
[ 0. 0.95681922 0. 0. 0.72428382 0. 0. 0. 1.16354101 0. ]
[ 0. 0. 0. 0. 0. 0. 0. 0. 0. 0. ]
[ 0. 0. 0. 0. 0. 0. 0. 0. 0. 0. ]

Now, the difference matrix of V_diff=V−V_approximation as follows:

Matrix V_diff:
[ 0. 0.06858972 0. 0. 0. 0. 0. 0. 0. 0. ]
[ 0. 0.00119917 0.69941013 0. 0. 0. 0. 0. 0. 0. ]
[ 0. 0. 0. 0. 0. 0. 0. 1. 0. 0. ]
[ 0. 0. 0. 0. 0. 0. 0. 0. 0. 1. ]
[ 0. 0. 0.34624095 0. 0. 0. −0.18875524 0. 0. 0. ]
[ 0. 0. 0. 0. 0. 1. 0. 0. 0. 0. ]
[ 0. 0.10085062 0. 0. 0. 0. 0.2620259 0. 0. 0. ]
[ 0. −0.16318929 0. 0.71052393 0. 0. 0. 0. 0. 0. ]
[ 0. 0. 0. 0. 0. 0. 0. 0. 0. 0. ]
[ 0. 0. 0. 0. 0. 0. 0.23304189 0. 0. 0. ]
[ 0. 0. 0. 0. 0. 0. 0. 0. 0.25563689 0. ]
[ 0. 0. 0. 0. 0. 0. 0. 0. 0. 0. ]
[ 0. 0.04318078 0. 0. 0.27571618 0. 0. 0. −0.16354101 0. ]
[ 1. 0. 0. 0. 0. 0. 0. 0. 0. 0. ]
[ 0. 0. 0. 0. 0. 0. 0. 0. 0. 0. ]

As shown above, the difference matrix has values ranging from −1 to 1. Positive values in this difference matrix represent users having unnecessary entitlements with higher positive values representing a greater chance that a user should not have that particular entitlement and the values themselves being the probability that a user should not have that entitlement.

Thus, as mentioned earlier, the matrix decomposition model provides a machine learning technique for identifying outlier entitlements, as part of a first main operation of the SLPGA engine 100. The use of entropy and conditional entropy finds the user attributes that define peer groups, as part of the second main operation of the SLPGA engine 100. Based on the identified user attributes from the second main operation, a commonality analysis may be done on those peer groups using a statistical analysis approach, in accordance with the third main operation of the SLPGA engine 100. Finally, in a fourth main operation of the SLPGA engine 100, the results of the first and third main operations are combined in a manner that eliminates false positives, to identify the user entitlements that represent potential risks of over privileging users and thus, presenting a risk to the integrity of the computing resources in the enterprise computing system and/or network.

Once the user entitlements that represent a potential risk to the enterprise computing system and/or network are identified through this process of the SLPGA engine 100, various operations may then be performed to address this risk. For example, this user entitlement risk information may be logged and stored for later retrieval by an administrator during an access certification or entitlement recertification operation so as to provide information for decision making as to whether particular users should be provisioned with particular user entitlements, i.e. determining whether a user should have particular access permissions or not. This helps to optimize accesses to computing resources by reducing unnecessary entitlements. In this way, the mechanisms of the illustrative embodiments can provide decision support and risk mitigation operations for improving the security of computing resources within an enterprise computing system and/or network.

In other illustrative embodiments, alert notifications may be sent to an administrator with suggested actions to take, such as revoking certain entitlements deemed to be risky as a result of the above operations performed by the SLPGA engine 100. In some illustrative embodiments, actions may be taken automatically by the IAM system, based on the output from the SLPGA engine 100, to revoke or at least suspend entitlements deemed to be risky as a result of the operations performed by the SLPGA engine 100, e.g., those users classified as "red" or even "yellow" in some embodiments. Moreover, different automated operations may be performed for different classes of risky entitlements, such as logging or automatically notifying an administrator regarding "yellow" classified users while automatically suspending or revoking entitlements for "red" classified users. In still other illustrative embodiments, the results of the SLPGA engine 100 evaluation of the users' entitlement risks may be stored and if a user whose entitlements have been flagged as "yellow" or "red" attempts to utilize those entitlements, the user's access may be blocked and the attempt to gain access to the computer resource may be reported to the administrator via an appropriate alert notification. Other responsive actions as may become aware to those of ordinary skill in the art in view of the present description are intended to be within the spirit and scope of the present invention.

Thus, the illustrative embodiments provide mechanisms for specifically configuring an improved computer tool to implement self-learning peer group analysis for optimizing identity and access management (IAM) computing environments. The mechanisms of the illustrative embodiments combine machine learning mechanisms with statistical analysis mechanisms to identify and analyze peer groups for user attributes and entitlements to identify outliers that may represent over privilege states which may require a responsive action to minimize the risk to the computing resources of the computer systems and/or networks being by IAM.

Figure 2:
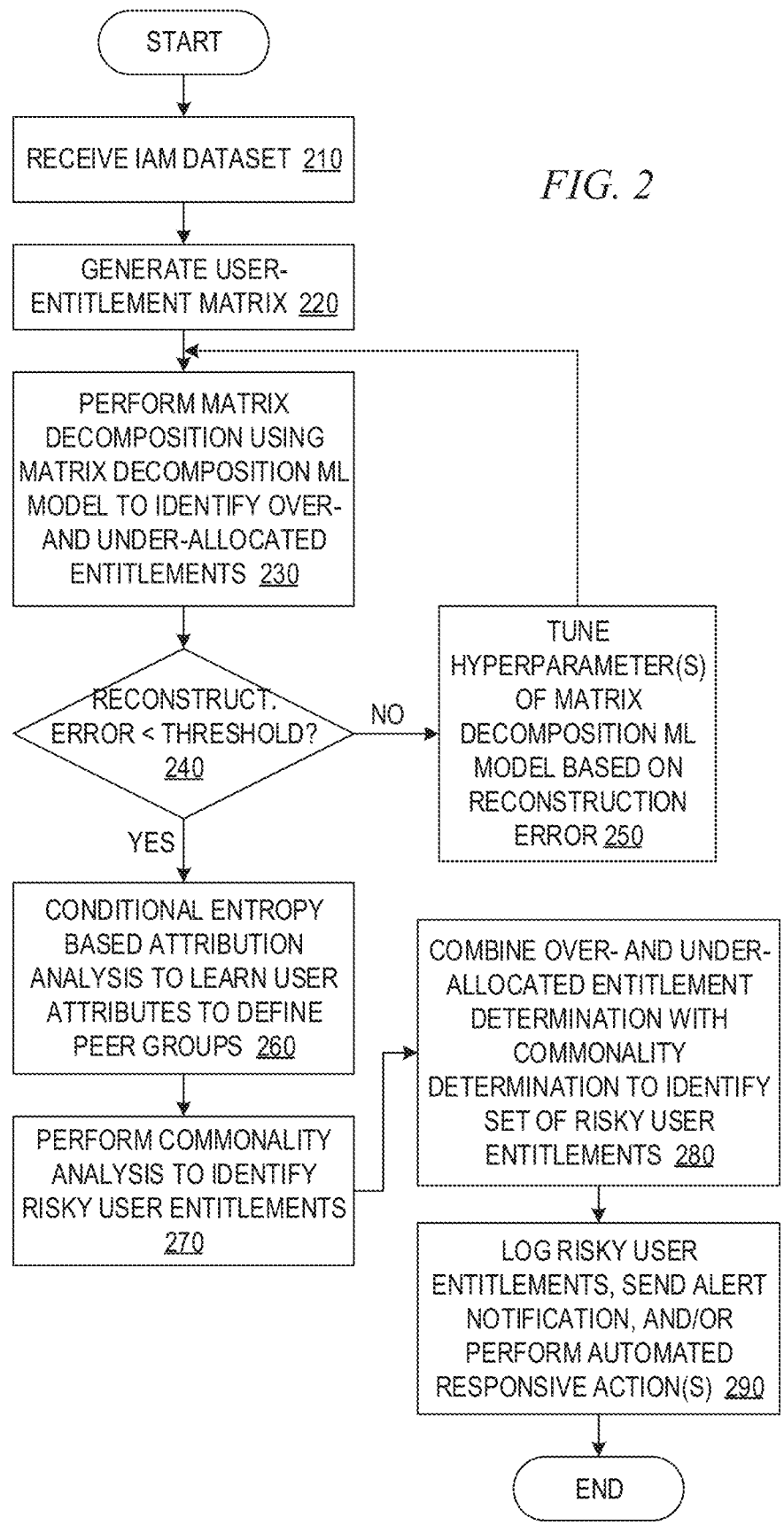
FIG. 2 is an example flowchart outlining an example operation of a SLPGA engine in accordance with one illustrative embodiment.

FIG. 2 is an example flowchart outlining an example operation of a SLPGA engine 100 in accordance with one illustrative embodiment. As shown in FIG. 2, the operation starts with obtaining the IAM data set specifying user-to-entitlement mapping information (step 210). This user-to-entitlement mapping information is then used as a basis for generating an original user entitlement matrix X that correlates entitlements with particular users, such as a matrix of 0-1 vector representations where a cell or vector slot has a 1 value if the user has the corresponding entitlement, and has a 0 value if the user does not have the corresponding entitlement (step 220). A matrix decomposition machine learning model is applied to the original user entitlement matrix X to identify undesirable excessive or deficient user entitlements, e.g., a NMF model may be applied to the original user entitlement matrix X to generate an approximation which is then subtracted from the original matrix X to identify over- or under-allocated entitlements (step 230). The reconstruction error associated with the application of the matrix decomposition machine learning model is compared to a threshold to determine if the reconstruction error is below this threshold (step 240). If the reconstruction error is not below this threshold, then the hyperparameter(s) of the matrix decomposition machine learning model are tuned, e.g., the k value of the NMF model is tuned, so as to reduce the reconstruction error and the operation returns to step 230 where the matrix decomposition machine learning is reapplied with the updated tuned hyperparameters (step 250).

Once the reconstruction error is below the acceptable threshold ("Yes" in step 240), then a conditional-entropy based attribution analysis is performed on the user attributes and privileges specified in the IAM data set to thereby learn the user attributes that should be used to define peer groups (step 260). Based on the identified user attributes for peer group definition, a commonality analysis is performed on the user entitlement data for users in the various peer groups defined by the identified user attributes to identify entitlements that fall into various categories of risk, e.g., green, yellow, and red in the examples described above, where "red" user entitlements indicate a commonality of the user entitlement that is below a given commonality threshold and represent a high risk, "yellow" user entitlements represent moderate risk and a commonality that is within a given range of commonality scores, and "green" user entitlements represent common user entitlements with a commonality that is greater than a given commonality threshold (step 270). The results of the identification of the undesirable excessive or deficient user entitlements from the application of the matrix decomposition machine learning model, and the results of the statistical analysis performed as part of the commonality analysis, are combined to reduce false positives with regard to excessive user entitlement allocations (step 280). The resulting set of user entitlements are then reported to the IAM system and/or administrator for further action or otherwise used to instigate automated responsive actions, such as automatically revoking user entitlements, suspending user entitlements, notifying system administrators, and the like (step 290). The operation then terminates.

Figure 3:
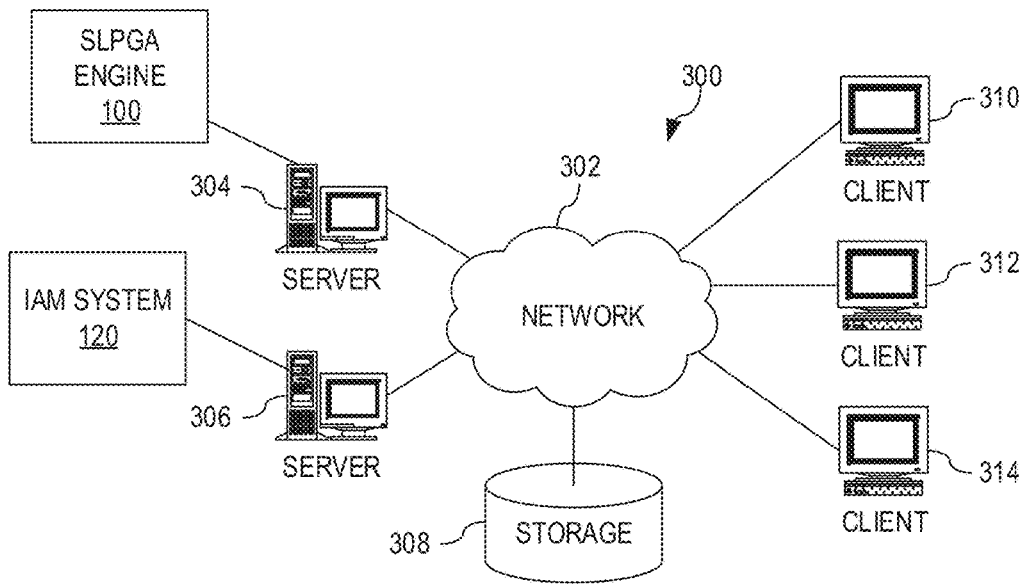
FIG. 3 is an example block diagram of an example distributed data processing system in which aspects of the illustrative embodiments may be implemented.

From the above description it is apparent that the illustrative embodiments may be utilized in many different types of data processing environments. For example, FIG. 3 depicts an example distributed data processing system environment in which aspects of the illustrative embodiments may be implemented. It should be appreciated that FIG. 3 is only an example of one type of data processing environment in which the aspects of the illustrative embodiments may be implemented and is not intended to assert or imply any limitation with regard to the environments in which aspects or embodiments of the present invention may be implemented. Many modifications to the depicted environment may be made without departing from the spirit and scope of the present invention.

As shown in FIG. 3, distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3, one or more of the servers 304, 306 may be specifically configured to implement a self-learning peer group analysis (SLPGA) engine 100, such as previously described above with regard to FIGS. 1 and 2, for example. The SLPGA engine 100 may operate in conjunction with an IAM system 120 which may be provided in another server computing system 304, 306, or in the same server computing system as the SLPGA engine 100 such that the SLPGA engine 100 and the IAM system 120 may be integrated with one another. In the depicted example, the IAM system 120 may be provided on server 306 which may be a computing system in an enterprise computing environment which may include the server 306 and one or more of the client computing devices 310-314, the storage device 308, and/or other computing resources. Meanwhile, the SLPGA engine 100 may be provided on a separate server computing system 304 which may, or may not, be part of this enterprise computing environment. In some illustrative embodiments, the services of the SLPGA engine 100 as described previously, may be provided as a separate service enlisted by the enterprise computing environment owner or operator, but may be provided by a separate computing tool provider.

Regardless of the particular arrangement of the distributed data processing system, the IAM system 120 provides an IAM data set to the SLPGA engine 100 which processes the IAM data set to identify outlier entitlements in the manner described above with regard to one or more of the illustrative embodiments. The SLPGA engine 100 may then log and/or provide an alert notification of these outlier entitlements back to the IAM system 120 for further action. As noted above, in some illustrative embodiments, the IAM system 120 may also automatically perform operations responsive to the identification of outlier entitlements to reduce risk to the computing resources protected by the IAM system 120, such as revoking entitlements, suspending entitlements, blocking access to particular computing resources, sending appropriate notifications, or the like.

As mentioned previously, in some illustrative embodiments, the SLPGA engine either as itself, or in combination with an IAM system, may be provided as a cloud service provided by a cloud computing system. The following description is a description of an example cloud computing system in which aspects of the illustrative embodiments may be implemented. It should be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
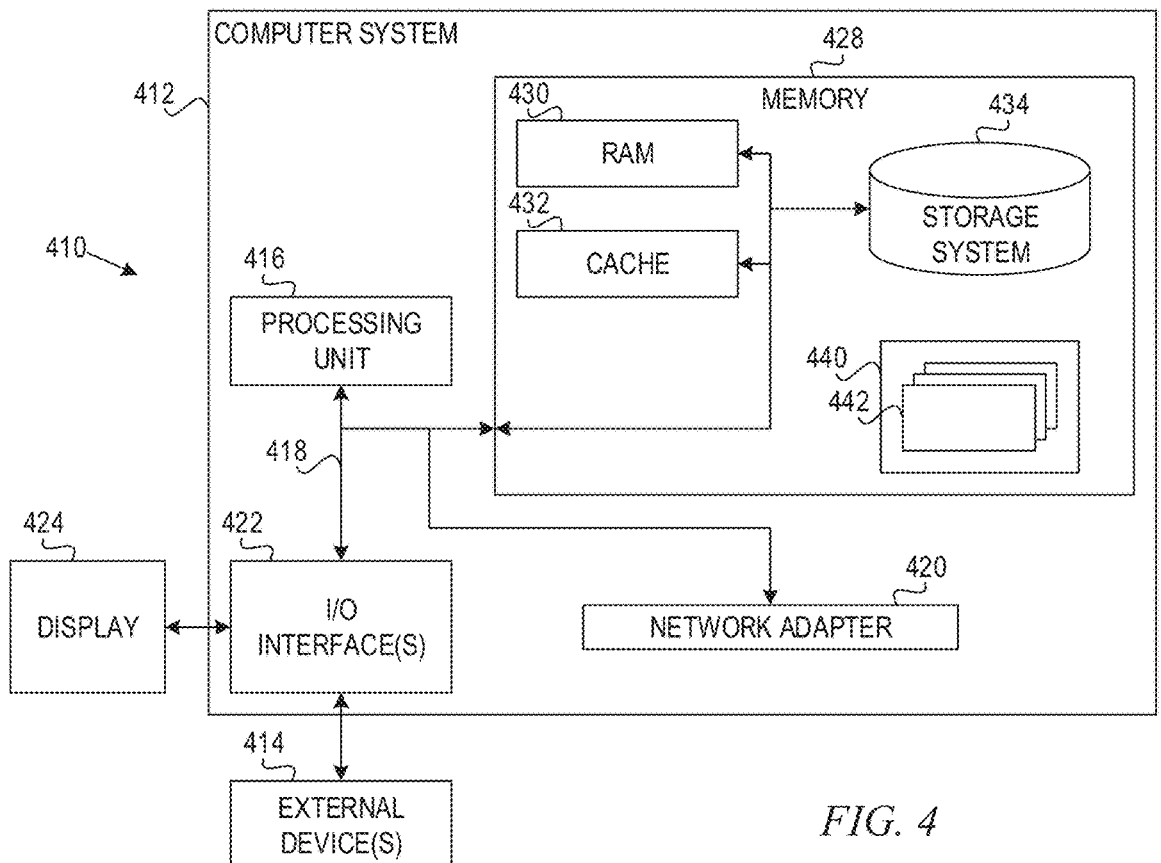
FIG. 4 depicts a cloud computing node according to one illustrative embodiment of the present invention.

Referring now to FIG. 4, a schematic of an example of a cloud computing node is shown. It should be appreciated that while FIG. 4 is described in the context of a cloud computing node, the depiction in FIG. 4 may also be that of a server computing system, such as servers 304, 306, or a client computing system, such as clients 310-314, for example. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412;

and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
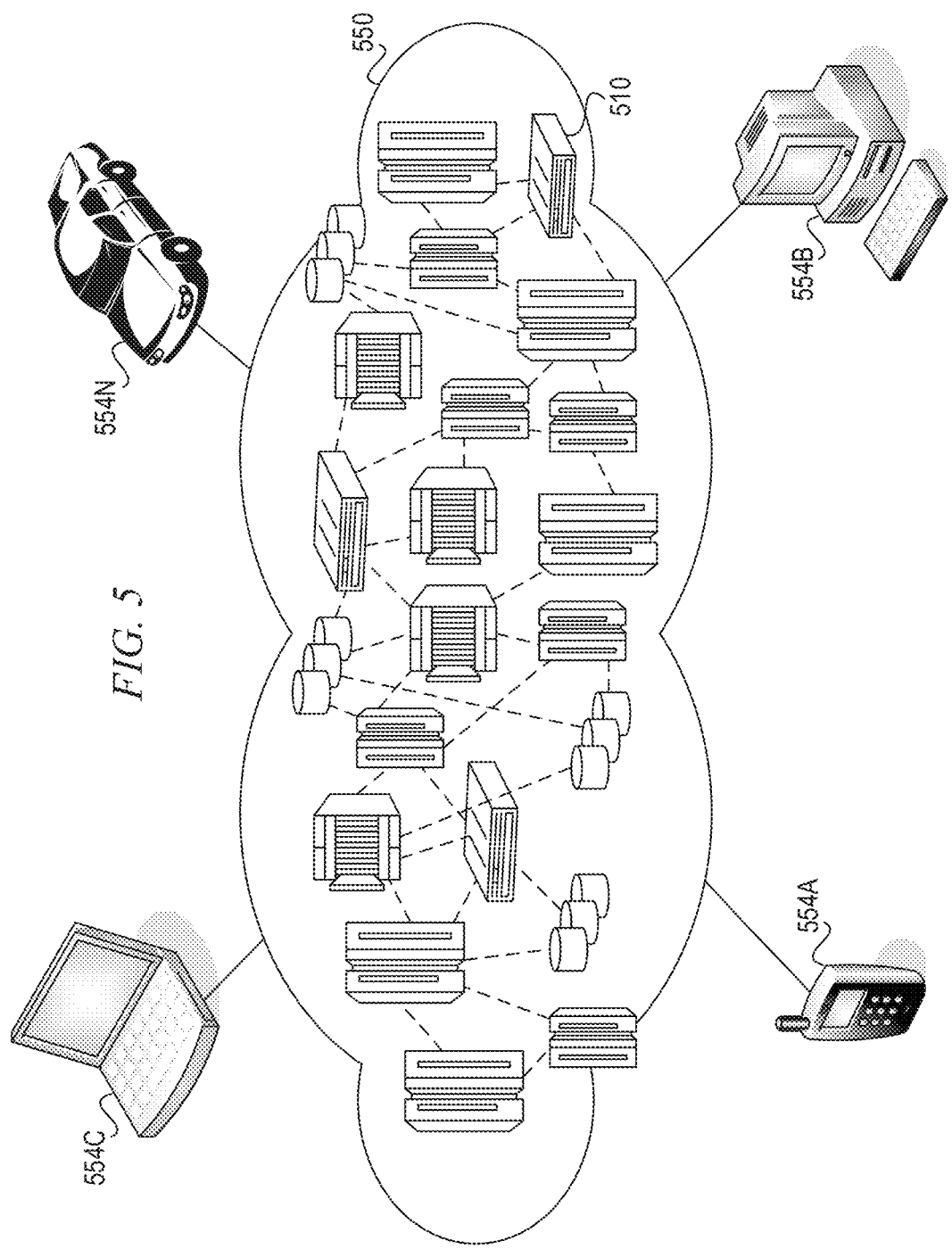
FIG. 5 depicts a cloud computing environment according to one illustrative embodiment of the present invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
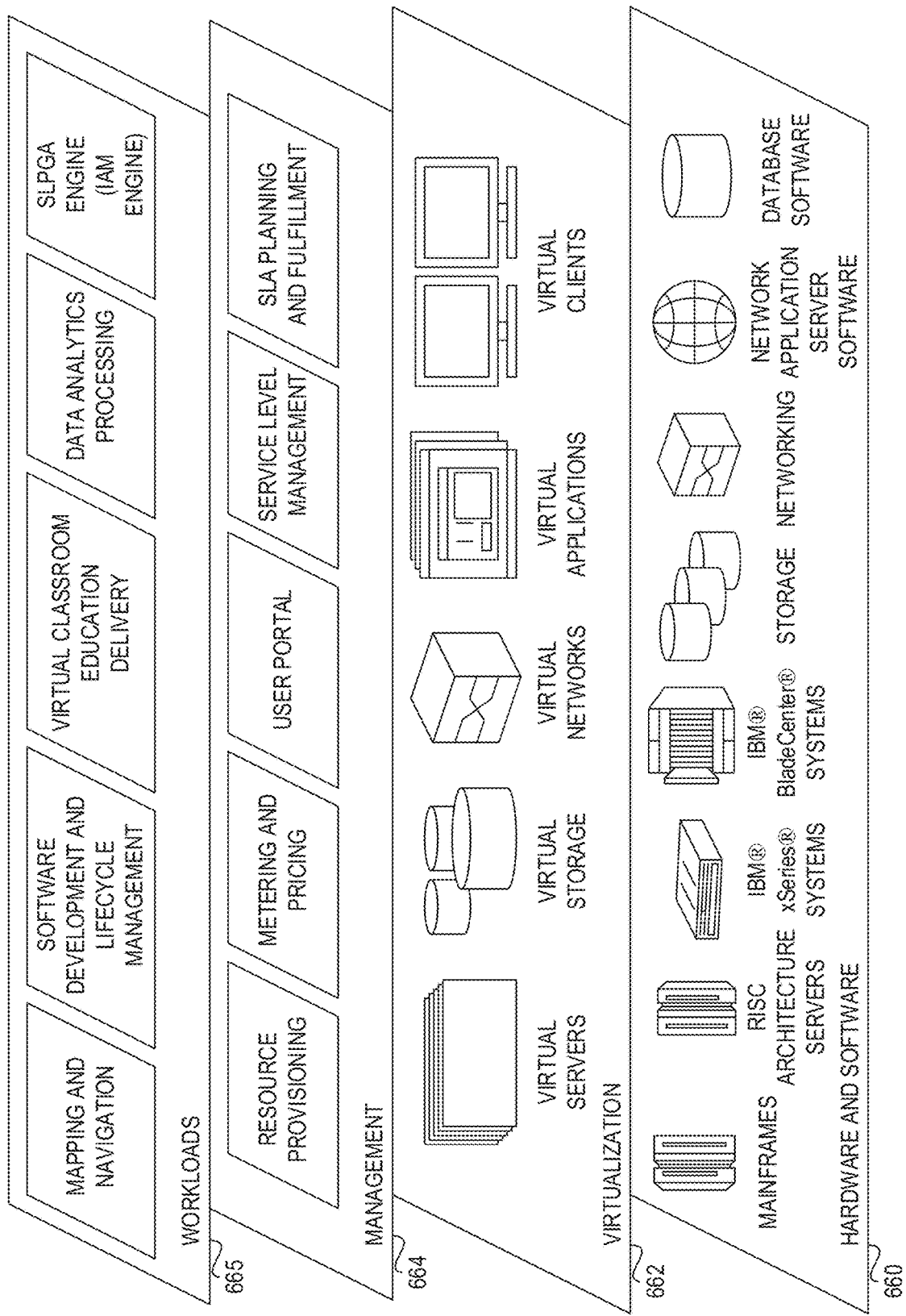
FIG. 6 depicts abstraction model layers according to one illustrative embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 665 provides examples of functionality for which the cloud computing environment may be utilized. Examples of workloads and functions which may be provided from this layer include: mapping and navigation; software development and lifecycle management; virtual classroom education delivery; data analytics processing; transaction processing; and SLPGA engine and/or IAM engine. The SLPGA engine and/or IAM engine may operate to perform the operations described previously with regard to one or more of the illustrative embodiments, but as a cloud service.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for identifying risky user entitlements in an identity and access management (IAM) computing system, the method comprising:
receiving, by a self-learning peer group analysis (SLPGA) engine executing in the data processing system, an IAM data set from the IAM computing system, wherein the IAM data set specifies user attributes of one or more users of computing resources and entitlements allocated to one or more users for accessing the computing resources;
generating, by the SLPGA engine, a user-entitlement matrix based on the IAM data set;
executing, by the SLPGA engine, a machine learning matrix decomposition computer model on the user-entitlement matrix to identify excessive entitlement allocations;
performing, by the SLPGA engine, a conditional entropy analysis of the user attributes and entitlements in the IAM data set to identify a set of user attributes for defining at least one peer group;
performing, by the SLPGA engine, a commonality analysis of user attributes and entitlements for each of one or more peer groups defined based on the set of user attributes to identify common and uncommon combinations of user attributes and entitlements in each peer group of the one or more peer groups; and
identifying, by the SLPGA engine, outlier entitlements based on the identification of the excessive entitlement allocations and results of the commonality analysis, wherein executing the machine learning matrix decomposition computer model on the user-entitlement matrix to identify excessive entitlement allocations comprises:
generating an approximation of the user-entitlement matrix by decomposing the user-entitlement matrix; and
generating a reconstruction error of the approximation based on a difference matrix corresponding to a difference between the approximation and the user-entitlement matrix, wherein positive values in the difference matrix indicate potential risk of unnecessary entitlements being assigned to corresponding users and negative values in the difference matrix indicate potential missing entitlements for corresponding users.

2. The method of claim 1, further comprising:
receiving a commonality threshold parameter indicating a degree of commonality to use for identifying outlier entitlements; and
determining a commonality of entitlements for users within a peer group based on a determination that the user entitlements that do not meet or exceed the commonality threshold parameter are the outlier entitlements.

3. The method of claim 1, wherein executing the machine learning matrix decomposition computer model generates an error measure for a matrix decomposition operation and performs a machine learning operation on the error measure to minimize the error measure at least by tuning one or more hyperparameters of the machine learning matrix decomposition computer model.

4. The method of claim 1, wherein the machine learning matrix decomposition computer model comprises a non-negative matrix factorization matrix decomposition model.

5. The method of claim 1, wherein executing the machine learning matrix decomposition computer model further comprises:
generating a representation of a plot of a rank hyperparameter, k, versus the reconstruction error for a plurality of matrix decompositions; and
selecting a value of k using an elbow methodology based on the representation of the plot.

6. The method of claim 1, wherein performing the conditional entropy analysis of the user attributes and entitlements in the IAM data set to identify a set of user attributes for defining peer groups, comprises, for each combination of user attribute and entitlement, for each of a plurality of users:
calculating, for the combination of user attribute and entitlement, a corresponding entropy value;
calculating, for the combination of user attribute and entitlement, a corresponding conditional entropy value;
comparing, for the combination of user attribute and entitlement, the conditional entropy value to the entropy value;
in response to the conditional entropy value being equal to or lower than a threshold value below the entropy value, adding the user attribute to a set of user attributes for defining at least one peer group; and
in response to the conditional entropy value not being equal to or lower than a threshold value below the entropy value, not adding the user attribute to the set of user attributes for defining at least one peer group.

7. The method of claim 1, wherein performing the commonality analysis comprises, for each peer group in the one or more peer groups, and for each combination of user attribute and for each entitlement:
calculating a commonality score based on a percentage of users in the peer group that have the user attribute and entitlement; and
determining a certainty of the entitlement as a function of the commonality score, wherein the function grows linearly for common entitlements and grows exponentially for uncommon entitlements.

8. The method of claim 1, wherein the data processing system is a cloud computing data processing system and the SLPGA engine is executed as a cloud service in the cloud computing data processing system.

9. The method of claim 1, wherein the data processing system in which the SLPGA engine is executed is a same data processing system as the IAM computing system.

10. A computer program product comprising a computer readable storage medium having a computer readable program stored therein, wherein the computer readable program, when executed in a data processing system, causes the data processing system to:
receive, by a self-learning peer group analysis (SLPGA) engine executing in the data processing system, an IAM data set from the IAM computing system, wherein the IAM data set specifies user attributes of one or more users of computing resources and entitlements allocated to one or more users for accessing the computing resources;
generate, by the SLPGA engine, a user-entitlement matrix based on the IAM data set;
execute, by the SLPGA engine, a machine learning matrix decomposition computer model on the user-entitlement matrix to identify excessive entitlement allocations;
perform, by the SLPGA engine, a conditional entropy analysis of the user attributes and entitlements in the IAM data set to identify a set of user attributes for defining at least one peer group;

perform, by the SLPGA engine, a commonality analysis of user attributes and entitlements for each of one or more peer groups defined based on the set of user attributes to identify common and uncommon combinations of user attributes and entitlements in each peer group of the one or more peer groups; and identify, by the SLPGA engine, outlier entitlements based on the identification of the excessive entitlement allocations and results of the commonality analysis, wherein executing the machine learning matrix decomposition computer model on the user-entitlement matrix to identify excessive entitlement allocations comprises:

generating an approximation of the user-entitlement matrix by decomposing the user-entitlement matrix; and generating a reconstruction error of the approximation based on a difference matrix corresponding to a difference between the approximation and the user-entitlement matrix, wherein positive values in the difference matrix indicate potential risk of unnecessary entitlements being assigned to corresponding users and negative values in the difference matrix indicate potential missing entitlements for corresponding users.

11. The computer program product of claim 10, wherein the computer readable program further causes the data processing system to:

receive a commonality threshold parameter indicating a degree of commonality to use for identifying outlier entitlements; and determine a commonality of entitlements for users within a peer group based on a determination that user entitlements that do not meet or exceed the commonality threshold parameter are the outlier entitlements.

12. The computer program product of claim 10, wherein executing the machine learning matrix decomposition computer model generates an error measure for a matrix decomposition operation and performs a machine learning operation on the error measure to minimize the error measure at least by tuning one or more hyperparameters of the machine learning matrix decomposition computer model.

13. The computer program product of claim 10, wherein the machine learning matrix decomposition computer model comprises a non-negative matrix factorization matrix decomposition model.

14. The computer program product of claim 10, wherein executing the machine learning matrix decomposition computer model further comprises:

generating a representation of a plot of a rank hyperparameter, k, versus the reconstruction error for a plurality of matrix decompositions; and selecting a value of k using an elbow methodology based on the representation of the plot.

15. The computer program product of claim 10, wherein performing the conditional entropy analysis of the user attributes and entitlements in the IAM data set to identify a set of user attributes for defining peer groups, comprises, for each combination of user attribute and entitlement, for each of a plurality of users:

calculating, for the combination of user attribute and entitlement, a corresponding entropy value;

calculating, for the combination of user attribute and entitlement, a corresponding conditional entropy value;

comparing, for the combination of user attribute and entitlement, the conditional entropy value to the entropy value;

in response to the conditional entropy value being equal to or lower than a threshold value below the entropy value, adding the user attribute to a set of user attributes for defining at least one peer group; and in response to the conditional entropy value not being equal to or lower than a threshold value below the entropy value, not adding the user attribute to the set of user attributes for defining at least one peer group.

16. The computer program product of claim 10, wherein performing the commonality analysis comprises, for each peer group in the one or more peer groups, and for each combination of user attribute and for each entitlement:

calculating a commonality score based on a percentage of users in the peer group that have the user attribute and entitlement; and determining a certainty of the entitlement as a function of the commonality score, wherein the function grows linearly for common entitlements and grows exponentially for uncommon entitlements.

17. The computer program product of claim 10, wherein the data processing system is a cloud computing data processing system and the SLPGA engine is executed as a cloud service in the cloud computing data processing system.

18. An apparatus comprising:

a processor; and a memory coupled to the processor, wherein the memory comprises instructions which, when executed by the processor, cause the processor to:

receive, by a self-learning peer group analysis (SLPGA) engine executing in the data processing system, an IAM data set from the IAM computing system, wherein the IAM data set specifies user attributes of one or more users of computing resources and entitlements allocated to one or more users for accessing the computing resources;

generate, by the SLPGA engine, a user-entitlement matrix based on the IAM data set;

execute, by the SLPGA engine, a machine learning matrix decomposition computer model on the user-entitlement matrix to identify excessive entitlement allocations;

perform, by the SLPGA engine, a conditional entropy analysis of the user attributes and entitlements in the IAM data set to identify a set of user attributes for defining at least one peer group;

perform, by the SLPGA engine, a commonality analysis of user attributes and entitlements for each of one or more peer groups defined based on the set of user attributes to identify common and uncommon combinations of user attributes and entitlements in each peer group of the one or more peer groups; and identify, by the SLPGA engine, outlier entitlements based on the identification of the excessive entitlement allocations and results of the commonality analysis, wherein executing the machine learning matrix decomposition computer model on the user-entitlement matrix to identify excessive entitlement allocations comprises:

generating an approximation of the user-entitlement matrix by decomposing the user-entitlement matrix; and generating a reconstruction error of the approximation based on a difference matrix corresponding to a difference between the approximation and the user-entitlement matrix, wherein positive values in the difference matrix indicate potential risk of unnecessary entitlements being assigned to corresponding users and negative values in the difference matrix indicate potential missing entitlements for corresponding users.

* * * * *